(12) United States Patent
Landry et al.

(10) Patent No.: US 7,319,280 B1
(45) Date of Patent: Jan. 15, 2008

(54) POWER LINE COUPLER ADAPTED FOR USE WITH MULTIPLE COMMUNICATION SYSTEMS USING DIFFERENT FREQUENCY SPECTRA

(75) Inventors: James F. Landry, Germantown, MD (US); Andrew Pozsgay, Germantown, MD (US)

(73) Assignee: Telkonet, Inc., Germantown, MD (US)

( * ) Notice: Subject to any disclaimer, the term of this patent is extended or adjusted under 35 U.S.C. 154(b) by 0 days.

(21) Appl. No.: 11/739,471

(22) Filed: Apr. 24, 2007

(51) Int. Cl.
*H02J 3/34* (2006.01)
*G05B 11/01* (2006.01)

(52) U.S. Cl. ............... 307/3; 307/DIG. 1; 340/310.11; 340/310.17; 340/310.18; 340/310.13

(58) Field of Classification Search ........... 307/DIG. 1, 307/3; 340/310.18, 310.13, 310.11, 310.12
See application file for complete search history.

(56) References Cited

U.S. PATENT DOCUMENTS

| | | | |
|---|---|---|---|
| 6,014,386 A | 1/2000 | Abraham | |
| 6,104,707 A * | 8/2000 | Abraham | 370/295 |
| 6,407,987 B1 * | 6/2002 | Abraham | 370/295 |
| 6,614,326 B2 | 9/2003 | Merriman et al. | |
| 6,710,704 B2 * | 3/2004 | Fisher et al. | 375/258 |
| 6,813,316 B2 | 11/2004 | Lohr | |
| 6,922,135 B2 * | 7/2005 | Abraham | 340/310.17 |
| 6,975,212 B2 * | 12/2005 | Crenshaw et al. | 375/260 |
| 7,060,350 B2 | 6/2006 | Takaya et al. | |
| 7,183,901 B2 * | 2/2007 | Legaud | 340/310.13 |

\* cited by examiner

*Primary Examiner*—Michael Sherry
*Assistant Examiner*—Michael Rutland-Wallis
(74) *Attorney, Agent, or Firm*—Burman Y. Mathis, III; Gary M. Nath; Jerald L. Meyer

(57) ABSTRACT

Devices and system for interfacing multiple power line communications (PLC)-enabled communication devices in a building are disclosed. In various embodiments, the system can include a high-frequency transformer coupled to a high-frequency communications device, a low-frequency transformer coupled to a low-frequency communication device, and one or more components adapted to appreciably abate distortion and/or attenuation of high-frequency signals passing through the first coupling device.

17 Claims, 5 Drawing Sheets

POWER LINE COUPLER ADAPTED FOR USE WITH MULTIPLE COMMUNICATION SYSTEMS USING DIFFERENT FREQUENCY SPECTRA

BACKGROUND

1. Technical Field

The present invention relates to power line communications (PLC) devices and systems.

2. Discussion of Related Art

The ability to interconnect computers and other intelligent devices, both internally and to the Internet, is a common requirement wherever people live and work today. The electrical connections required to form various local area network (LANs) have traditionally been accomplished by installing dedicated data wiring both inside buildings and between clusters of buildings. A number of wireless methods have also been developed and deployed to address this need.

Unfortunately, retrofitting existing buildings with special wiring can be expensive, and wireless systems are often inappropriate in high-density dwellings where excessive interference can be expected and the available bandwidth can be quickly overwhelmed. To address these problems, power line communications (PLC) technology, which allows existing electric power wiring to simultaneously transport power and high-speed data, has been realized. Unfortunately, PLC technology, while constantly improving, is often a relatively expensive to implement. Accordingly, new PLC solutions for providing less expensive yet more efficient LANs and Internet connections are desirable.

SUMMARY

In accordance with an exemplary embodiment, a coupling system for interfacing a high-frequency power line communications (PLC)-enabled communication device and a low-frequency PLC-enabled communications device with a low-voltage power network is disclosed. The system includes a first coupling device that includes a high-frequency transformer having a first primary side and a first secondary side, wherein the first primary side is electrically coupled to the high-frequency communications device, and the first secondary side is capacitively coupled to a first power line of the power line network via a first capacitor, a second coupling device that includes a low-frequency transformer having a second primary side and a second secondary side, wherein the second primary side is electrically coupled to the low-frequency communication device, and the second secondary side is capacitively coupled to the first power line of the power line network via a second capacitor, wherein the a second coupling device is adapted to appreciably abate at least one of distortion and attenuation of high-frequency signals passing through the first coupling device.

In accordance with another exemplary embodiment, a coupling system for interfacing a high-frequency power line communications (PLC)-enabled communication device and a low-frequency PLC-enabled communications device with a low-voltage power network is disclosed. The system includes a first coupling device that includes a high-frequency transformer having a first primary side and a first secondary side, wherein the first primary side is electrically coupled to the high-frequency communications device, and the first secondary side is capacitively coupled to a first power line of the power line network via a first capacitor, and a coupling means for coupling low-frequency communication signals between the low-frequency communication device and the power network while abating at one of distortion and attenuation of high-frequency signals passing through the first coupling device.

In accordance with yet another exemplary embodiment, a coupling system for interfacing a high-frequency power line communications (PLC)-enabled communication device and a low-frequency PLC-enabled communications device with a low-voltage power network is disclosed. The system includes one or more high-frequency transformers each having a first primary side and a first secondary side, wherein each of the first primary sides is electrically coupled to the high-frequency communications device and each of the first secondary sides is capacitively coupled to a power line of the power network, and one or more low-frequency transformers each having a second primary side and a second secondary side, wherein each of the second primary sides is electrically coupled to the low-frequency communications device and each of the second secondary sides is capacitively coupled to a power line of the power network, wherein the one or more high-frequency transformers and the one or more low-frequency transformers are commonly located at a service panel.

DETAILED DESCRIPTION

Figure 1:
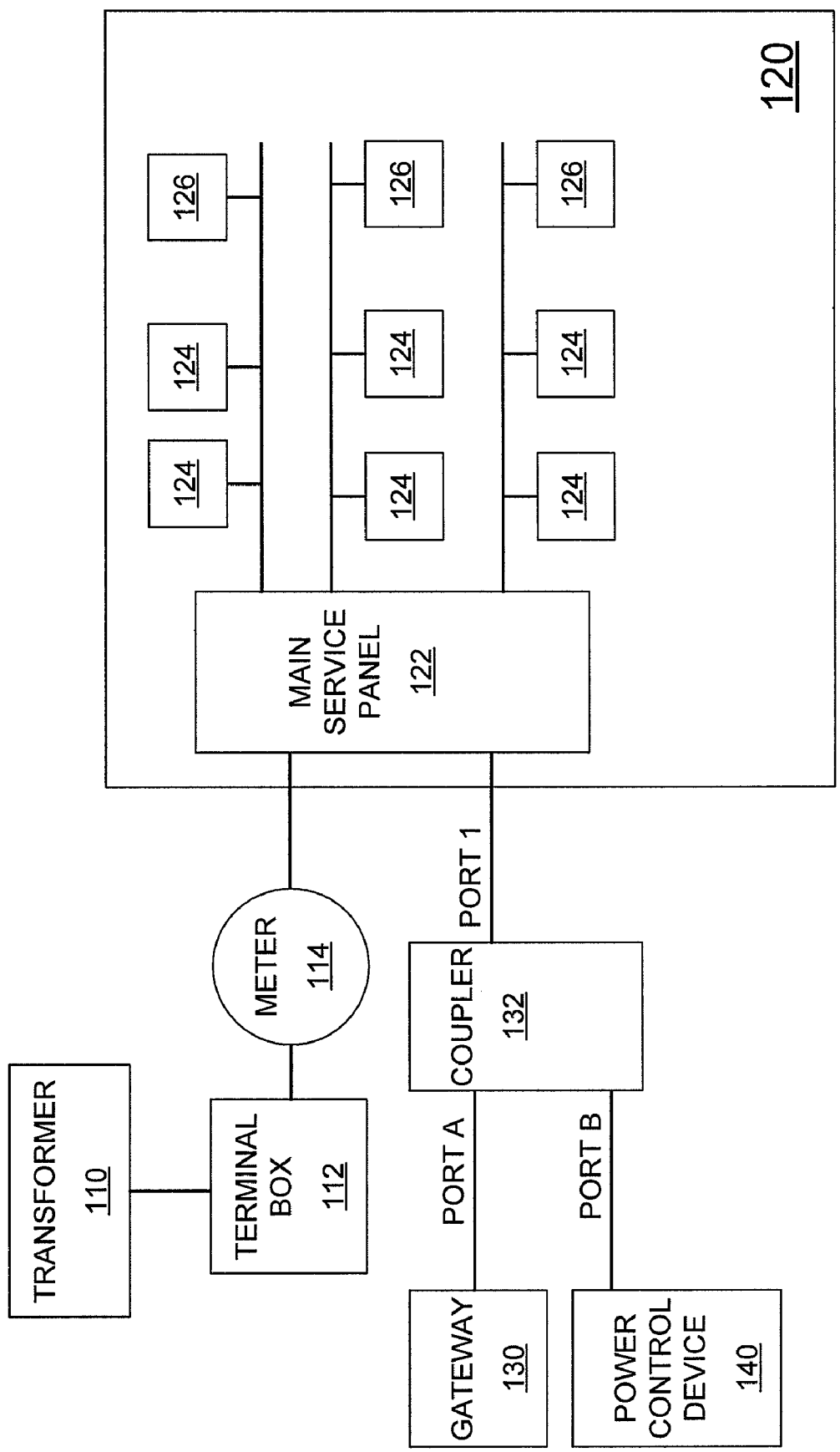
FIG. 1 is a block diagram of a power line communications (PLC) system implemented for use in a building using a low-voltage power network.

The disclosed methods and systems will now be described more fully hereinafter with reference to the accompanying drawings, in which preferred embodiments of the invention are shown. The disclosed methods and systems may, however, be embodied in many different forms and should not be construed as being limited to the embodiments set forth herein. Rather, these embodiments are provided so that this disclosure will convey the scope of the invention to those skilled in the art. In the drawings, like reference numbers refer to like elements throughout the specification.

FIG. 1 is a block diagram of a power line communications system implemented for use in a building using a low-voltage power network. As shown in FIG. 1, the power network can include a transformer 110 coupled to a terminal box 112 via a power line network that may range from a single-phase power system to a three-phase power system. The power lines of the power line network may be forwarded from the terminal box 112 to an electric power meter 114 and then to a main service panel 122, where power may then be distributed to various PLC-enabled high-frequency terminals 124 and low-frequency terminals 126 residing within building 120.

Note that while a single power meter 114 and service panel 122 are depicted in the example of FIG. 1, in various embodiments the methods and systems of this disclosure may be adapted for use with multiple power meters and/or multiple service panels.

As is also depicted in FIG. 1, a gateway 130 connected to an Internet service provider (not shown) can be electrically coupled to a coupler 132 via a coaxial cable, wireless network or any other number of known or later-developed means. The coupler 132, in turn, may be in close proximity to and/or can be electrically coupled to the service panel 122 via a communications port PORT 1 in order to enable the gateway 130 to communicate with the various high-frequency terminals 124. Additionally, a power control device 140 connected to a power scheduling and monitoring system (not shown) also can be similarly coupled to the service panel 122 and the low-frequency terminals 126 via coupler 132.

In operation, the transformer 110, terminal box 112, electric meter 114 and service panel 122 may be used to distribute electrical power throughout the building 120.

As electrical power is distributed throughout the building 120, the gateway 130 can provide a number of communication services for the various terminals 124 using a high-frequency broadband signal. For example, in various embodiments the gateway 130 can act as a hub in a hub-and-spoke topology local area network (LAN), thus enabling those broadband-enabled terminals 124 on one or more branches extending from the service panel 122 to readily communicate with one another. Further, the gateway 110 can provide Internet access for the various broadband-enabled terminals 124 and/or provide access to distant LANs, storage devices and so on.

While the exemplary high-frequency signals include an OFDM-based LAN broadband protocol known as Homeplug® developed by Intellon Corporation of Ocala, Fla. (United States), the particular protocol can vary from embodiment to embodiment to use any known or later developed PLC-based communication standards, as well as any other capable communication standard developed for other media, such as HomePNA® which was developed for broadband communications over telephony/POTS twisted-wire pairs. Still further, in addition to LAN signals, the coupler 132 may pass on non-LAN signals, such as any number of DSL or other WAN signals.

In addition to the high-frequency broadband signals passed between the gateway 130 and the high-frequency broadband-enabled terminals 124, the coupler 132 can simultaneously pass communication signals adhering to a second (low-frequency) protocol to enable communications between the power control device 140 and the available low-frequency terminals 126. Generally, the low-frequency signals are typically used for various environmental controls, such as lights and HVAC, as well as various security, safety and alarm systems that do not require large amounts of data. However, the particular use of the low-frequency signals may change from embodiment to embodiment as may be found advantageous or desirable. Typically, such low-frequency systems may run at frequencies between 100 KHz and 400 KHz, which is in contrast to the high-frequency broadband signals of the gateway 130, which typically may run at frequencies between 2 MHz to 30 MHz.

While the exemplary dwelling 120 is a garden-style apartment or some other structure that is typically known to use three-phase power with one or more electric meters, in other embodiments the dwelling 120 can be any form of commercial or residential structure.

Figure 2:
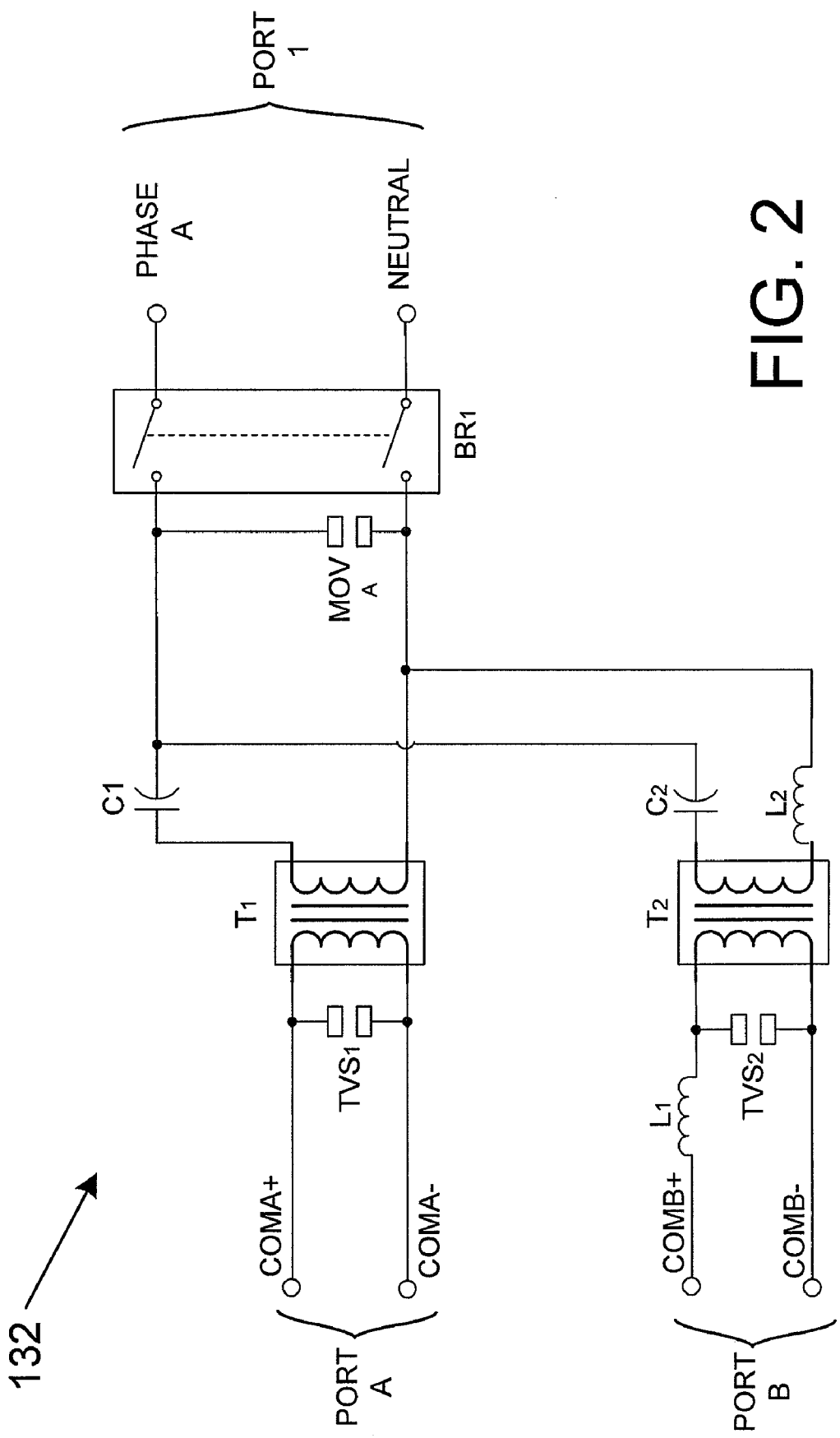
FIG. 2 is a schematic diagram of an exemplary embodiment of a first dual coupler system adapted for use with multiple communications devices and a low-voltage power network.

FIG. 2 is a schematic diagram of an exemplary coupler 132 adapted for use with both high-frequency broadband communication signals and low-frequency control/communications signals.

Starting from the upper left-hand side of FIG. 2, a pair of communications lines COMA+ and COMA− capable of carrying one or more broadband communication signals, such as the HomePlug® standard signal discussed above, may be coupled to the primary side of a high-frequency/broadband balun transformer $T_1$. An optional transient voltage suppressor $TVS_1$ may be placed between the communications lines COMA+ and COMA− to handle voltage spikes that may be cause by outside conditions, such as lightening strikes.

A first capacitor $C_1$ may be connected in series the top terminal transformer $T_1$'s secondary side. The first capacitor $C_1$, along with the bottom secondary terminal of transformer $T_1$, may be connected to power phase line PHASE A and electrical neutral/ground line NEUTRAL via a first (optional) resettable breaker $BR_1$ and the PORT 1 terminal discussed with respect to FIG. 1.

Note that an optional metal oxide varistor $MOV_A$ may be provided to protect against transient voltage spikes.

Now starting from the lower left-hand side of FIG. 2, another pair of communications lines COMB+ and COMB− capable of carrying one or more low-frequency communication signals may be coupled to the primary side of a low-frequency balun transformer $T_2$. An optional transient voltage suppressor $TVS_2$ may be placed between the communications lines COMB+ and COMB− to handle voltage spikes.

Further, an inductor $L_1$ may be placed in series with the primary side of the low-frequency transformer $T_2$.

At the secondary side of transformer $T_2$, a second capacitor $C_2$ may be connected in series (e.g., at the top terminal of the secondary side) with transformer $T_2$. As with the first capacitor $C_1$, the second capacitor $C_2$ may be further connected to the power phase line PHASE A via the resettable breaker $BR_1$. Additionally, a second inductor $L_2$ may be connected in series (e.g., at the bottom terminal of the secondary side) with transformer $T_2$, to couple transformer $T_2$ to the bottom secondary terminal of transformer $T_1$ and the neutral/return line NEUTRAL via resettable breaker $BR_1$.

In operation, high-frequency communication signals passing through the COMA+ and COMA− lines can be fed to transformer $T_1$, and passed through capacitor $C_1$ and breaker $BR_1$. The high-frequency communication signals may then propagate to high-frequency PLC-enable terminals coupled to the power phase line PHASE A. Similarly, communication signals originating from such high-frequency PLC-enabled terminals on power phase line PHASE A can propagate (right to left) though breaker $BR_1$, capacitor $C_1$ and transformer $T_1$ to the COMA+ and COMA− lines of PORT A.

Simultaneously, low-frequency communication signals passing through the COMB+ and COMB− lines can be fed to transformer $T_2$, and passed through capacitor $C_2$ and breaker $BR_1$. The low-frequency communication signals can then propagate to a number of appropriately enabled terminals coupled to the power phase line PHASE A. Similarly, communication signals originating from the appropriately enabled terminals on power phase line PHASE A can propagate (right to left) though breaker $BR_1$, capacitor $C_2$ and transformer $T_2$ to the COMB+ and COMB− lines of PORT B.

In various embodiments, it may be important to minimize the amount of high-frequency energy transmitted from a gateway or broadband-enabled terminal from propagating upward in PORT B. By preventing such high-frequency energy leakage into PORT B, distortion and attenuation may both be lessened. Similarly, it may be advantageous to minimize the amount of low-frequency from propagating upward in PORT A.

The exemplary coupler 132 may employ several techniques and devices to reduce high-frequency and low-frequency signal leakage.

The first technique is to strategically pick the type of transformers.

For example, it may be beneficial to use a high-frequency transformer having an air core, a dielectric core or a ferrite core having high-permeability, while using a low-frequency transformer having an iron core or a ferrite core having a high-permeability, but low-frequency range. Accordingly, transformer $T_1$ may readily couple high-frequency signals while transformer $T_2$ tends to reject the same high-frequency signals. Similarly, transformer $T_2$ may readily couple low-frequency signals while transformer $T_1$ tends to reject the same low-frequency signals.

Another viable technique can include employing either or both of inductors $L_1$ and $L_2$, both of which may act as high-frequency blocking devices. Note that when inductor $L_2$ is used, it may be advantageous to place inductor $L_2$ as close as possible to transformer $T_2$ as possible.

Still another technique may be to choose appropriate capacitor values for both capacitor $C_1$ and capacitor $C_2$, e.g., choose capacitor $C_1$ to be smaller than capacitor $C_2$. Typically, in order to minimize low-frequency energy from propagating up PORT A while potentially reducing costs, the capacitance of capacitor $C_1$ should be less than the capacitance of capacitor $C_2$.

Note that the values of capacitors $C_1$ and $C_2$ may vary substantially from embodiment to embodiment, as well as from building to building, given that each building's electrical system may have substantially different electrical characteristics that may benefit from different capacitive values.

Figure 3:
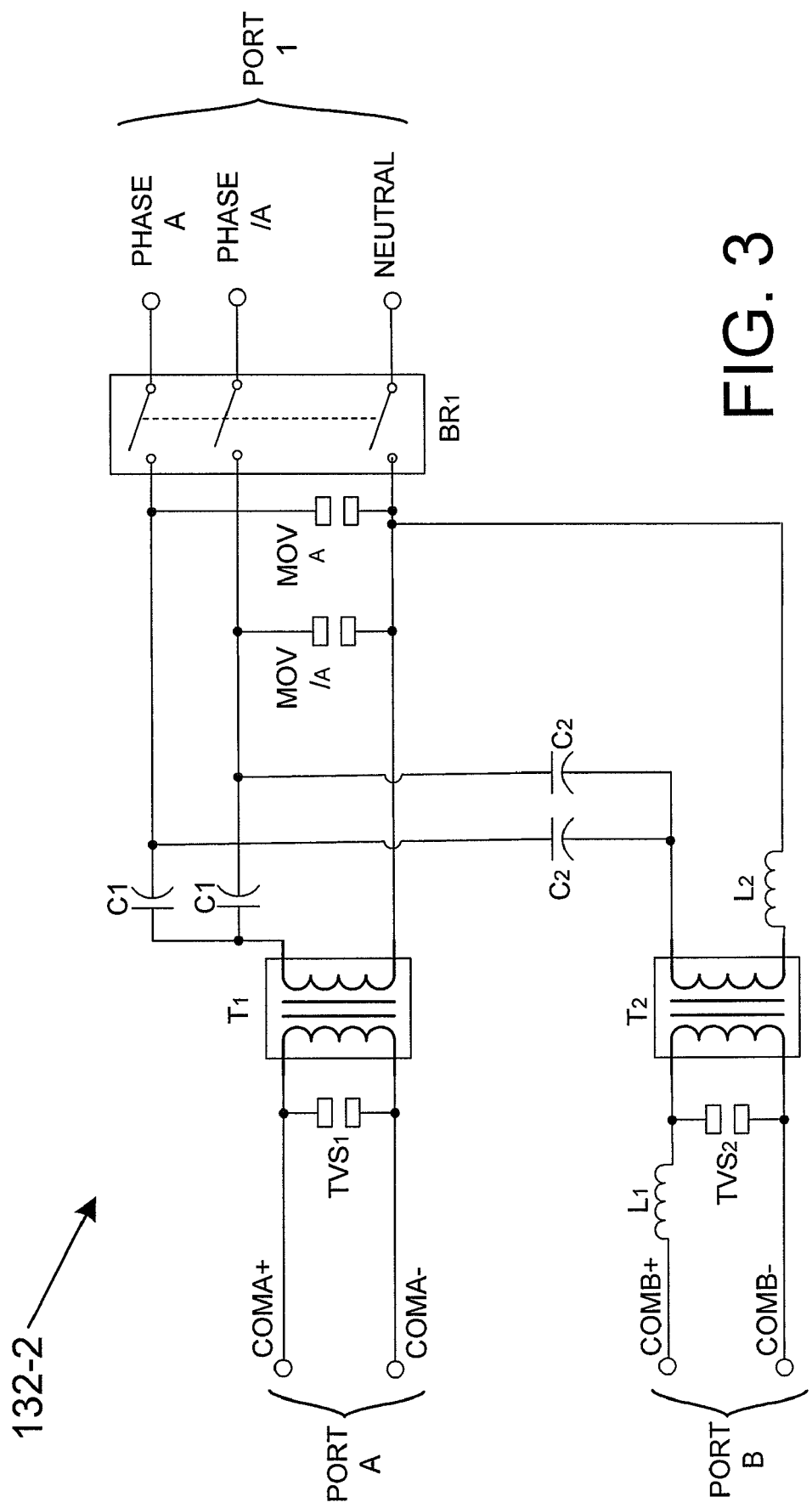
FIG. 3 is a schematic diagram of another exemplary embodiment of a first dual coupler system adapted for use with multiple communications devices and a low-voltage power network.

Also note that while the embodiment of FIG. 2 is designed to address a single-phase system, the methods and systems of the present embodiment may be extended to other electrical distribution systems. For example, continuing to FIG. 3, an exemplary embodiment of another high-frequency/low-frequency communication coupler 132-2 is shown for a two-phase power network. As shown in FIG. 3, the second communication coupler 132-2 is similar to that of FIG. 2, but has multiple high-frequency capacitors $C_1$ and multiple low-frequency capacitors $C_2$ respectively coupling transformer $T_1$ and transformer $T_2$ with the PHASE A and PHASE /A power lines. Additionally, two metal oxide varistors $MOV_A$ and $MOV_B$ may be provided to protect against transient voltage spikes.

Figure 4:
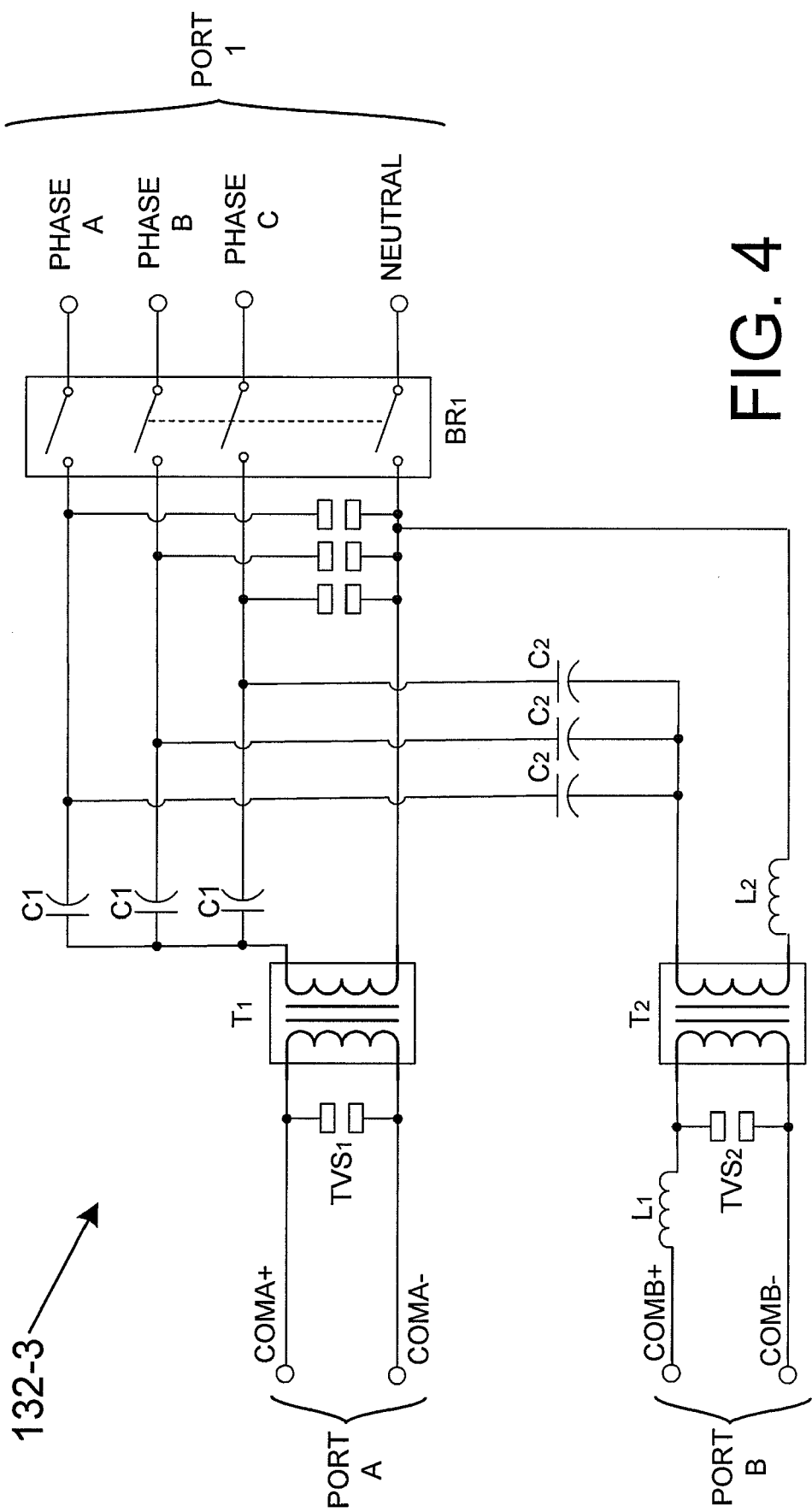
FIG. 4 is a schematic diagram of yet another exemplary embodiment of a first dual coupler system adapted for use with multiple communications devices and a low-voltage power network.

Continuing to FIG. 4, an exemplary embodiment of a three-phase communication coupler 132-3 is shown in context with a three-phase power system. As is shown in FIG. 4, the third communication coupler 132-3 is similar to that of FIG. 3 in that the third communication coupler 132-3 includes multiple (three) high-frequency capacitors $C_1$ and multiple (three) low-frequency capacitors $C_2$ respectively coupling transformer $T_1$ and transformer $T_2$ with the PHASE A, PHASE B and PHASE C power lines.

Figure 5:
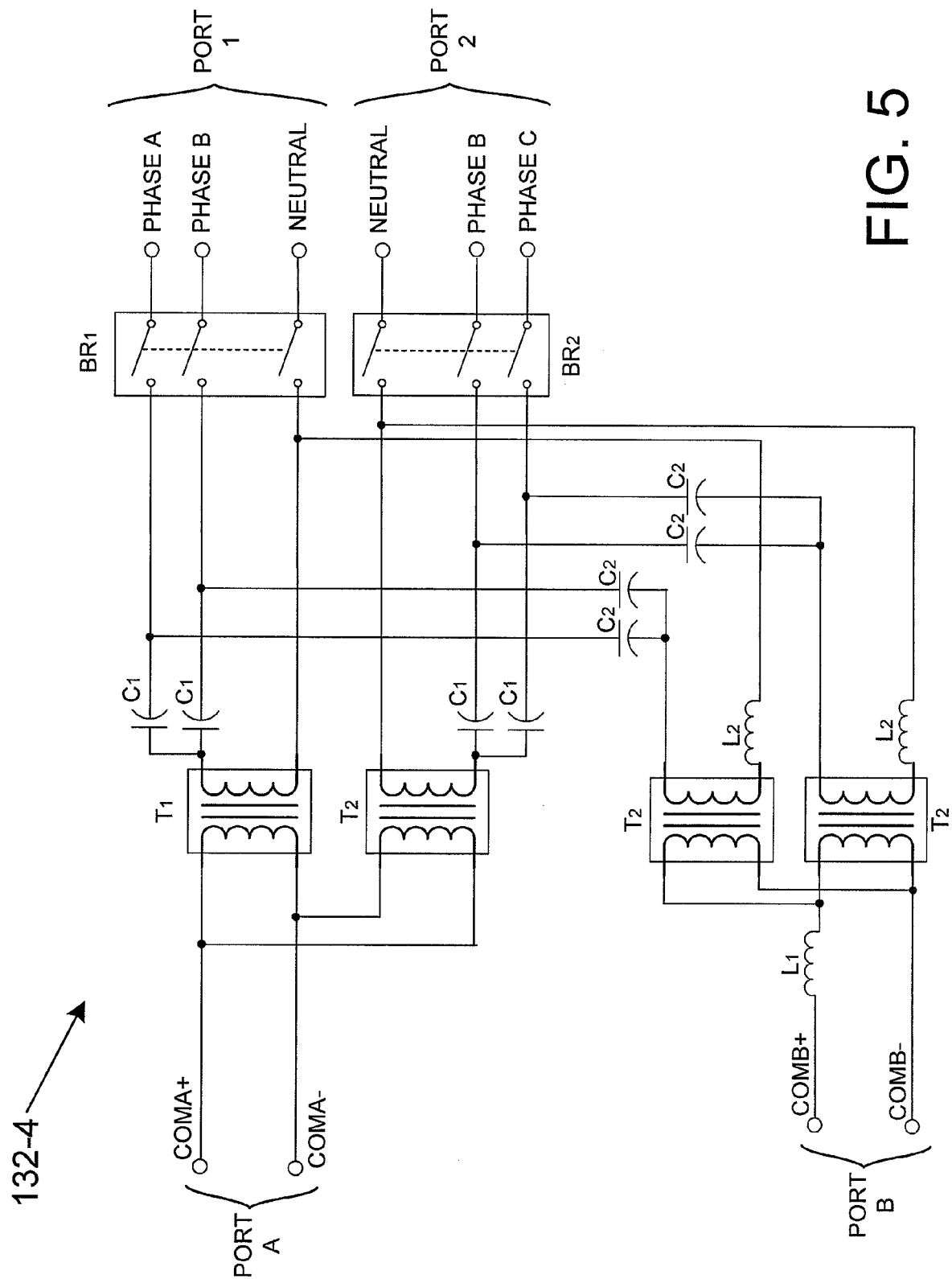
FIG. 5 is a schematic diagram of still yet another exemplary embodiment of a first dual coupler system adapted for use with multiple communications devices and a low-voltage power network.

Continuing again to FIG. 5, yet another exemplary embodiment of a three-phase communication coupler 132-4 is shown in context with a three-phase power system having two power meters (not shown). The architecture of FIG. 5 can be used to comply with various regulatory and safety regulations. More particularly, the coupler 132-4 does not allow for the appreciable transfer of electric current between two electric meters in a way that might distort their power consumption measurement and/or provide a potential electrical hazard, ground-fault source and so on. Additional information about electrical systems having multiple electric meters may be found in U.S. patent application Ser. No. 11/739,747 entitled "POWER LINE COUPLER ADAPTED FOR USE WITH MULTIPLE ELECTRIC POWER METERS" by A. Poszgay and J. Landry filed on Apr. 24, 2007 herein incorporated by reference in its entirety.

While the coupling devices depicted above are known as examples of capacitive coupling, it should be appreciated that the basic concepts can be extended to inductive coupling. Although inductive coupling devices are often far bulkier than capacitive devices, especially for power networks carrying a substantial amount of current, they may nonetheless be useful.

Generally, an example of an inductive coupling approach analogous to that of FIG. 3 can include a first coupling device that includes a high-frequency transformer $T_1$ having a first primary side and a first secondary side. The first primary side can be electrically coupled to a high-frequency communications device via lines COMA+ and COMA−, and the first secondary side can be inductively coupled to a first power line of the power line network, e.g., Phase A may pass through the secondary side of transformer $T_1$.

Additionally, a second coupling device can be used that includes another transformer $T_2$ having a second primary side and a second secondary side. The second primary side can be electrically coupled to a low-frequency communication device via lines COMB− and COMB+, and the second secondary side can be inductively to the first power line of the power line network (thus eliminating the need for the secondary-side capacitors). Note that typically all the current of each power line will pass through a respective secondary side, which may require transformers of substantial size in order to prevent saturation of the transformer.

Also note that in some embodiments the transformers can be toroids, and in some of those embodiments the toroid transformers may be "clamshell" devices for ease of installment.

As with the previous embodiments, the transformers may be made of different frequency-discriminating materials, and blocking inductors may be used on one or both of the COMB+ and COMB− lines. However, also note that blocking capacitors may also be used on a primary side of a transformer in series with one or both of the COMA+, COMA− lines. Thus, the first coupling device may be made to appreciably abate distortion and attenuation of low-frequency signals passing through the second coupling device, while the second coupling device may be made to appreciably abate distortion and attenuation of high-frequency signals passing through the first coupling device.

Note that in embodiments for multi-phase power networks, the general concept for inductive coupling may be extended by using multiple transformers in parallel, which may or may not share common blocking capacitors and/or blocking inductors.

In various embodiments where the above-described systems and/or methods are implemented using a programmable device, such as a computer-based system or programmable logic, it should be appreciated that the above-described systems and methods can be implemented using any of various known or later developed programming languages, such as "C", "C++", "FORTRAN", Pascal", "VHDL" and the like.

Accordingly, various storage media, such as magnetic computer disks, optical disks, electronic memories and the like, can be prepared that can contain information that can direct a device, such as a computer, to implement the above-described systems and/or methods. Once an appropriate device has access to the information and programs contained on the storage media, the storage media can provide the information and programs to the device, thus enabling the device to perform the above-described systems and/or methods.

For example, if a computer disk containing appropriate materials, such as a source file, an object file, an executable file or the like, were provided to a computer, the computer could receive the information, appropriately configure itself and perform the functions of the various systems and methods outlined in the diagrams and flowcharts above to implement the various functions. That is, the computer could receive various portions of information from the disk relating to different elements of the above-described systems and/or methods, implement the individual systems and/or methods and coordinate the functions of the individual systems and/or methods related to communication services.

The many features and advantages of the disclosed methods and systems are apparent from the detailed specification, and thus, it is intended by the appended claims to cover all such features and advantages of the invention which fall within the true spirit and scope of the disclosed methods and systems. Further, since numerous modifications and variations will readily occur to those skilled in the art, it is not desired to limit the disclosed methods and systems to the exact construction and operation illustrated and described, and accordingly, all suitable modifications and equivalents may be resorted to, falling within the scope of the disclosed methods and systems. The scope of the claims, therefore, should be accorded the broadest interpretation so as to encompass all such modifications and similar arrangements.

What is claimed is:

1. A coupling system for interfacing a high-frequency power line communications (PLC)-enabled communication device and a low-frequency PLC-enabled communications device with a low-voltage power network, the system comprising:
   a first coupling device that includes a high-frequency transformer having a first primary side and a first secondary side, wherein the first primary side is electrically coupled to the high-frequency communications device, and the first secondary side is capacitively coupled to a first power line of the power line network via a first capacitor;
   a second coupling device that includes a low-frequency transformer having a second primary side and a second secondary side, wherein the second primary side is electrically coupled to the low-frequency communication device, and the second secondary side is capacitively coupled to the first power line of the power line network via a second capacitor;
   wherein the second coupling device is adapted to appreciably abate at least one of distortion and attenuation of high-frequency signals passing through the first coupling device.

2. The system of claim 1, wherein the low-frequency transformer has a core made of at least one iron, an iron alloy or a ferrite material.

3. The system of claim 2, wherein the low-frequency transformer has a core made of a ferrite material.

4. The system of claim 2, wherein the low-frequency transformer is configured to pass frequencies ranging from about 100 KHz to about 400 KHz.

5. The system of claim 1, wherein the high-frequency transformer has a core made of at least one of a ferrite material, a dielectric material and air.

6. The system of claim 5, wherein the high-frequency transformer has a core made of a ferrite material.

7. The system of claim 5, wherein the high-frequency transformer is configured to pass frequencies ranging from about 2 MHz to about 30 MHz.

8. The system of claim 1, wherein the first capacitor has a substantially smaller capacitance value than the second capacitor.

9. The system of claim 1, further comprising a first inductor in series with the second secondary side to block substantial amounts of high-frequency energy from reaching the second primary side.

10. The system of claim 9, wherein the first inductor is placed between the second secondary side and a ground line of the power network.

11. The system of claim 1, further comprising a first inductor in series with the second primary side to block substantial amounts of high-frequency energy from reaching the low-frequency communications device.

12. The system of claim 1, wherein the first coupling device and the second coupling device are located in close proximity to a main electrical service panel.

13. The system of claim 12, wherein the power network is a three-phase power system and both the first coupling device and the second coupling device are both capacitively coupled to all three phases of the power network.

14. A coupling system for interfacing a high-frequency power line communications (PLC)-enabled communication device and a low-frequency PLC-enabled communications device with a low-voltage power network, the system comprising:
   a first coupling device that includes a high-frequency transformer having a first primary side and a first secondary side, wherein the first primary side is electrically coupled to the high-frequency communications device, and the first secondary side is capacitively coupled to a first power line of the power line network via a first capacitor; and
   a coupling means for coupling low-frequency communication signals between the low-frequency communication device and the power network while simultaneously abating at one of distortion and attenuation of high-frequency signals passing through the first coupling device.

15. The system of claim 14, wherein the coupling means includes a low-frequency transformer and one or more rejection means for rejecting high-frequency signals.

16. The system of claim 14, wherein the rejection means includes an inductor placed between a terminal of the low-frequency transformer and an electrical ground line of the power network.

17. The system of claim 14, wherein the first capacitor has a capacitance value that appreciably abates attenuation of the low-frequency communication signals.

* * * * *